(No Model.)
G. ANDREWS.
ANIMAL TRAP.
No. 465,011. Patented Dec. 15, 1891.
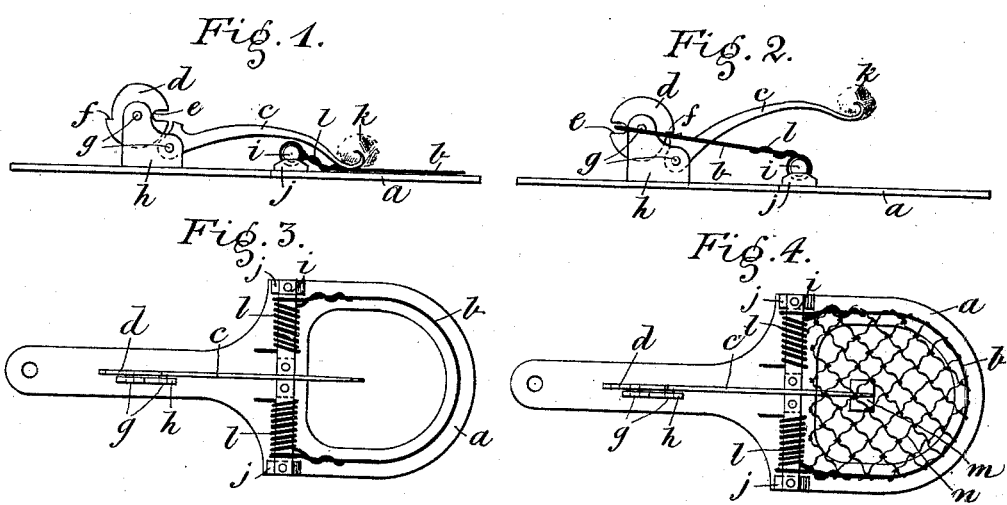
Witnesses.
Inventor.
George Andrews,
per J. P. Bayly,
attorney.

UNITED STATES PATENT OFFICE.

GEORGE ANDREWS, OF ASHFORD, ENGLAND.

ANIMAL-TRAP.

SPECIFICATION forming part of Letters Patent No. 465,011, dated December 15, 1891.

Application filed April 7, 1891. Serial No. 388,040. (No model.) Patented in England July 4, 1890, No. 10,372.

*To all whom it may concern:*

Be it known that I, GEORGE ANDREWS, engineer, a subject of the Queen of Great Britain, residing at Jessamine Villa, Hunter's Road, Willesborough, Ashford, in the county of Kent, England, have invented a new and useful Improvement in Means or Apparatus for Trapping Animals and Birds, (for which I have obtained provisional protection in Great Britain No. 10,372, bearing date July 4, 1890,) of which the following is a specification.

My invention relates to improvements in means or apparatus for trapping animals and birds, which consists of a fork or perch of any suitable shape on, in, or below a platform or trap-door, with a fall-down, fall-over, or close-up cage, the said cage or crusher closing directly an animal or bird puts their feet on the perch or trap-door by their weight operating on a lever, this said lever releasing the trapping mechanism or device by dropping on or over the said animal or bird for the purpose of catching the same alive or killing the same instantaneously. I attain these objects by the mechanism illustrated in the accompanying drawings, in which—

Figure 1 is an elevation of an animal-trap to kill. Fig. 2 is an elevation of Fig. 1, set to catch an animal. Fig. 3 is a plan of Fig. 1. Fig. 4 is a plan of Fig. 3, with a net to catch an animal or bird alive.

Similar letters refer to similar parts throughout the several views.

This invention I attach to various suitably-shaped beds $a$, as in Figs. 1, 2, 3, and 4, or boxes, with a raised platform $r$, having a channel all round or partially round the said platform $r$. Across the center beneath the platform $r$ I fix, by means of coil-springs $l$ on a bar $i$, a curved arm or arms $b$, pivoted to the bar $i$ in the channel on either side of the platform $r$, and to this curved arm I place a suitable net $n$ or any other device, such as bars with spikes $w$. In the center of the platform I construct a trap-door $q$, attached to a lever $s$ or levers, (or other device,) the end of which runs out at the end of the box in the channel toward a loose catch $t$, pivoted at $g$ on a support $v$, to which is forced back the curved arm $b$ and held with a pin $u$ in a notch or slot by the lever mechanism $s'$ down into the channel. To the top at one end and at the two sides I provide loosely-hinged shutter-flaps $o\ o$ and $p$ for the purpose of concealing the mechanism placed in the before-said channels. The shutter-flaps $o\ o$ and $p$ are then closed over flush with the platform $r$ and trap-door $q$, the whole being covered with a gravelly surface, giving the trap the appearance of the ordinary ground.

Directly a bird or animal place their feet on the trap $q$ the lever $s$ releases the curved arm $b$, which said arm $b$ strikes open the flaps and falls down over the bird or animal by the power of the springs and secures the bird or animal alive. This said device may be adopted on an open metallic flat or any other shaped frame, as in Figs. 1, 2, 3, and 4, with a disk $d$, with a slot $e$, and stop $f$, pivoted to a standard $h$ for setting, attached to the plate $a$, and, being provided with a fall-over loop $b$, is intended to throw over and crush or kill any animal between the fall-over frame $b$ and the platform $a$, or with a net $n$, as in Fig. 4, to catch animals or birds alive. Bait $k$ or a small platform $m$ may be attached to the lever-arm $c$. The bar $i$ is supported by bearers $j$. This trap is set, as in Fig. 2, by forcing back the loop $b$ into the slot $e$ of the disk $d$ and placing the lever $c$ beneath the notch $f$, the trap being thrown by the animal or bird's weight or by its endeavor to remove the bait $k$ from the end of the lever $c$.

The trap-door $q$ is constructed to fall by the weight of the animal and turn the lever from the loose arm $t$, on which the aforesaid loop is placed in order to release the pin $u$, loop $b$, or ring to throw the trap.

To the fall-down traps I adopt the same or similar throw-off mechanism with a lever or levers applied in such a manner that by a small weight on the trap-door or a perch a cage is forced down onto a platform or the ground by the power of spiral or any other springs. Catches, set-pins, pulls, or draw-ups are used in the various positions for the purpose of holding the cage or crusher up during the process of setting the said traps. The aforesaid may be adapted to catch the bird or animal alive, or I use a fall-down herein termed a "crusher" when I wish to kill the animal instantaneously against the platform.

This invention may be constructed of any metallic, hemp, silk, cotton, wood, or of any other suitable substance.

The object of my invention is to provide an instantaneous fall-down cage, net, throw-over trap to catch animals or birds of any dimensions without injuring the same, or to adopt the "crusher" principle when the bird or animal is intended to be instantaneously killed.

It will be understood that the shapes, materials, and proportions of the various parts may be varied in many ways within the scope of my invention.

What I claim, and desire to secure by Letters Patent of the United States, is—

An animal-trap consisting of a base or platform having in combination thereon a standard, a rotative disk mounted on said standard, a cam and slot in said disk, a trigger pivoted to said standard and having a lug for engaging the cam, the opposite end thereof being provided with a bait-hook, and a spring-actuated reticulated frame having its free end extended over and engaging the slot for setting the trap.

GEORGE ANDREWS.

Witnesses:
A. E. TAYLOR,
H. UPTON.